(12) United States Patent
Cruz Mota et al.

(10) Patent No.: US 9,450,972 B2
(45) Date of Patent: Sep. 20, 2016

(54) NETWORK ATTACK DETECTION USING COMBINED PROBABILITIES

(71) Applicant: Cisco Technology, Inc., San Jose, CA (US)

(72) Inventors: Javier Cruz Mota, Assens (CH); Andrea Di Pietro, Lausanne (CH); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 14/338,751

(22) Filed: Jul. 23, 2014

(65) Prior Publication Data

US 2016/0028751 A1 Jan. 28, 2016

(51) Int. Cl.
*H04L 29/06* (2006.01)
(52) U.S. Cl.
CPC .................. *H04L 63/1408* (2013.01)
(58) Field of Classification Search
CPC ... G06F 21/554; H04W 12/12; H04W 84/18; H04L 63/1408; H04L 41/30
See application file for complete search history.

(56) References Cited

U.S. PATENT DOCUMENTS

| 7,873,583 | B2 | 1/2011 | Laxman et al. |
| 8,065,722 | B2 | 11/2011 | Barford et al. |
| 8,103,727 | B2 | 1/2012 | Lin |
| 8,504,504 | B2 | 8/2013 | Liu |
| 8,682,812 | B1 | 3/2014 | Ranjan |
| 2004/0172557 | A1* | 9/2004 | Nakae ................ H04L 63/0227 726/22 |
| 2005/0286772 | A1 | 12/2005 | Albertelli |
| 2007/0094728 | A1 | 4/2007 | Julisch et al. |
| 2008/0083029 | A1 | 4/2008 | Yeh et al. |
| 2010/0146615 | A1* | 6/2010 | Locasto ............. H04L 63/1408 726/11 |

\* cited by examiner

*Primary Examiner* — Brandon Hoffman
*Assistant Examiner* — Nega Woldemariam
(74) *Attorney, Agent, or Firm* — Parker Ibrahim & Berg LLC; James M. Behmke; Stephen D. LeBarron

(57) ABSTRACT

In one embodiment, a device in a network receives a set of output label dependencies for a set of attack detectors. The device identifies applied labels that were applied by the attack detectors to input data regarding a network, the applied labels being associated with probabilities. The device determines a combined probability for two or more of the applied labels based on the output label dependencies and the probabilities associated with the two or more labels. The device selects one of the applied labels as a finalized label for the input data based on the probabilities associated with the applied labels and on the combined probability for the two or more labels.

26 Claims, 16 Drawing Sheets

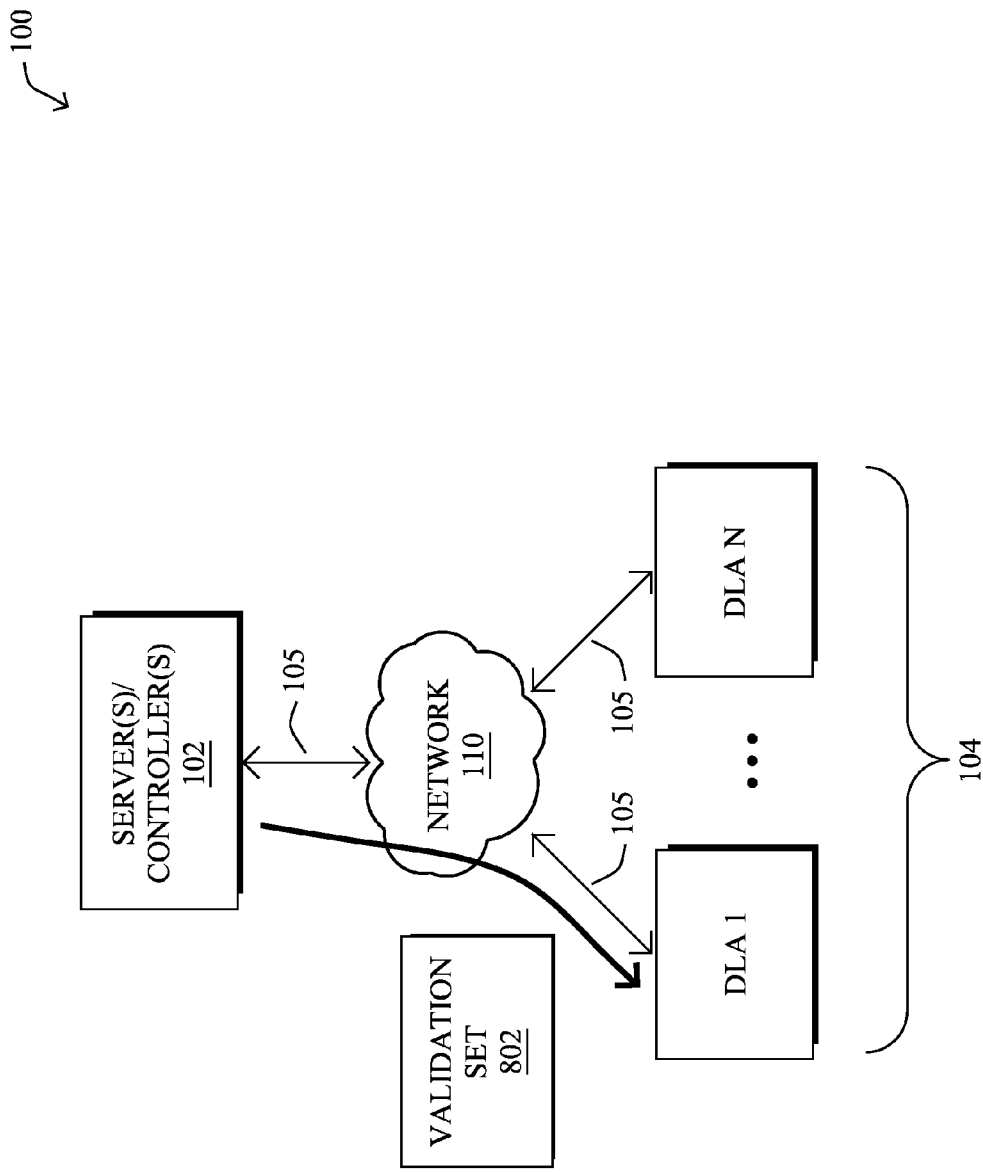

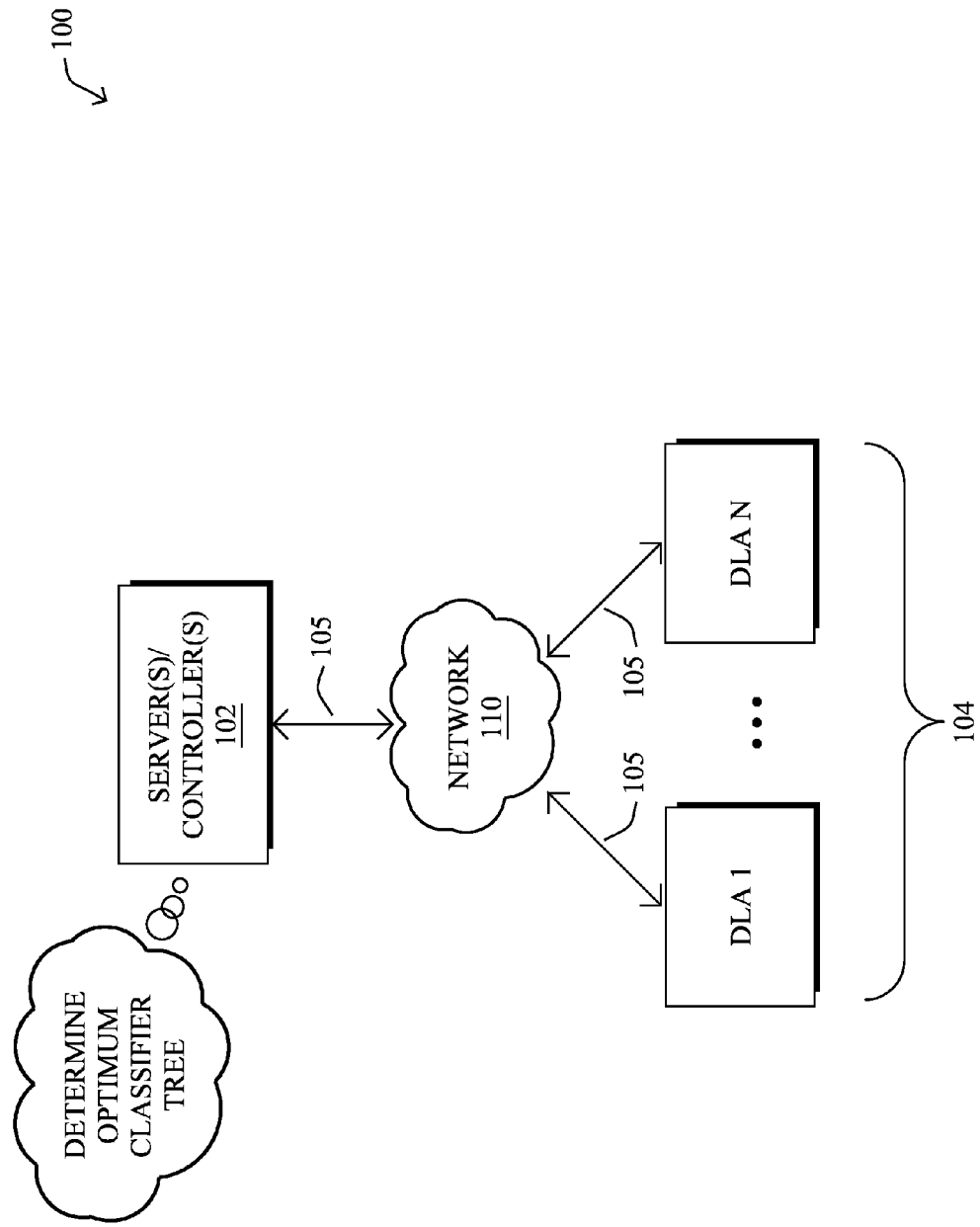

NETWORK ATTACK DETECTION USING COMBINED PROBABILITIES

TECHNICAL FIELD

The present disclosure relates generally to computer networks, and, more particularly, to detecting a network attack using combined probabilities.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 8A-8C illustrate an example of an attack detector being validated;

DESCRIPTION OF EXAMPLE EMBODIMENTS

Overview

Figure 1:
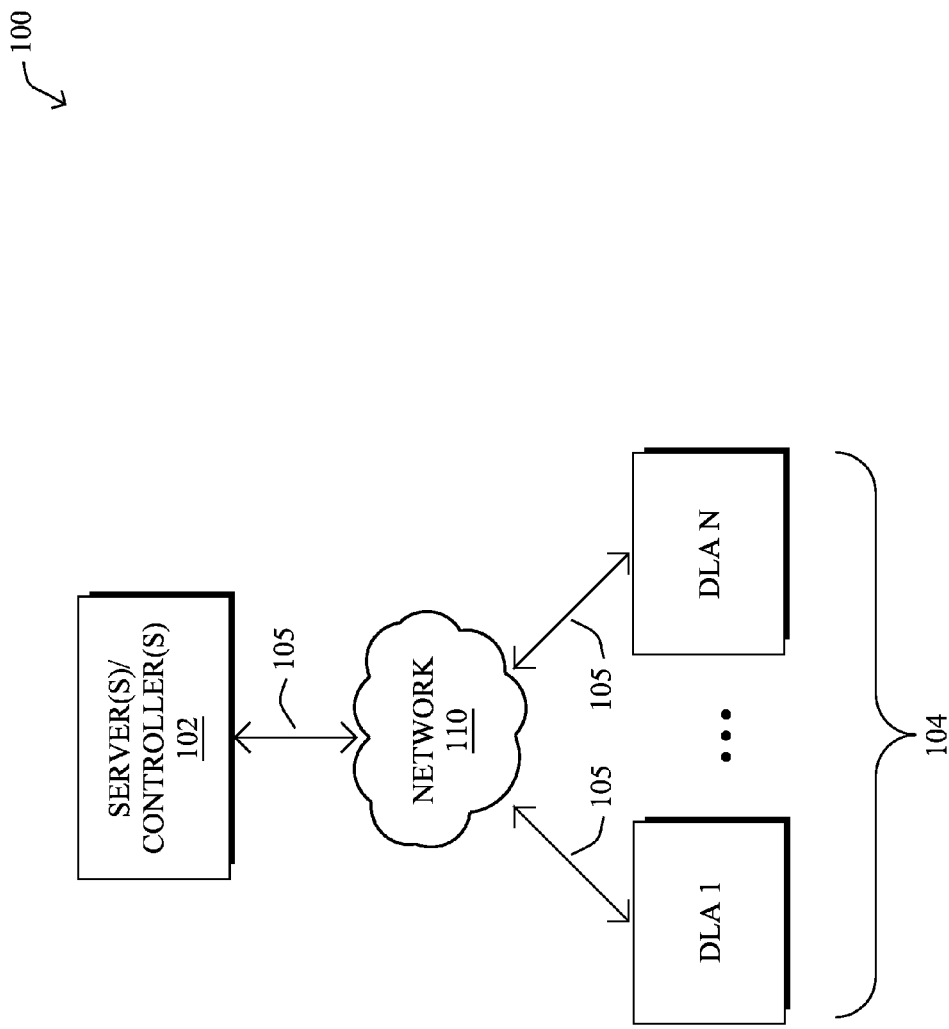
FIG. 1 illustrates an example communication network.

According to one or more embodiments of the disclosure, a device in a network receives a set of output label dependencies for a set of attack detectors. The device identifies applied labels that were applied by the attack detectors to input data regarding a network, the applied labels being associated with probabilities. The device determines a combined probability for two or more of the applied labels based on the output label dependencies and the probabilities associated with the two or more labels. The device selects one of the applied labels as a finalized label for the input data based on the probabilities associated with the applied labels and on the combined probability for the two or more labels.

In further embodiments, a device in a network identifies, for each of a plurality of attack detectors, a set of output labels used by the attack detector, where the attack detector is configured to apply one of the set of output labels to an input data set regarding the network. The device determines a set of output label dependencies between the sets of output labels for the attack detectors. The device provides the attack detectors to one or more nodes in the network. The device also provides the set of output label dependencies to the one or more nodes in the network. The one or more nodes use the set of output label dependencies to select a finalized label from among output labels applied by the attack detectors.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in network 110.

Nodes/devices 104 may include any form of networking device used to generate, forward, receive, etc., traffic within network 110. For example, nodes/device 104 may include, but are not limited to, routers, switches, computers, or the like. As shown, and in accordance with various embodiments described herein, nodes/devices 104 may be distributed learning agents (DLAs) that are configured to detect an attempted network attack by analyzing the conditions of network 110.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
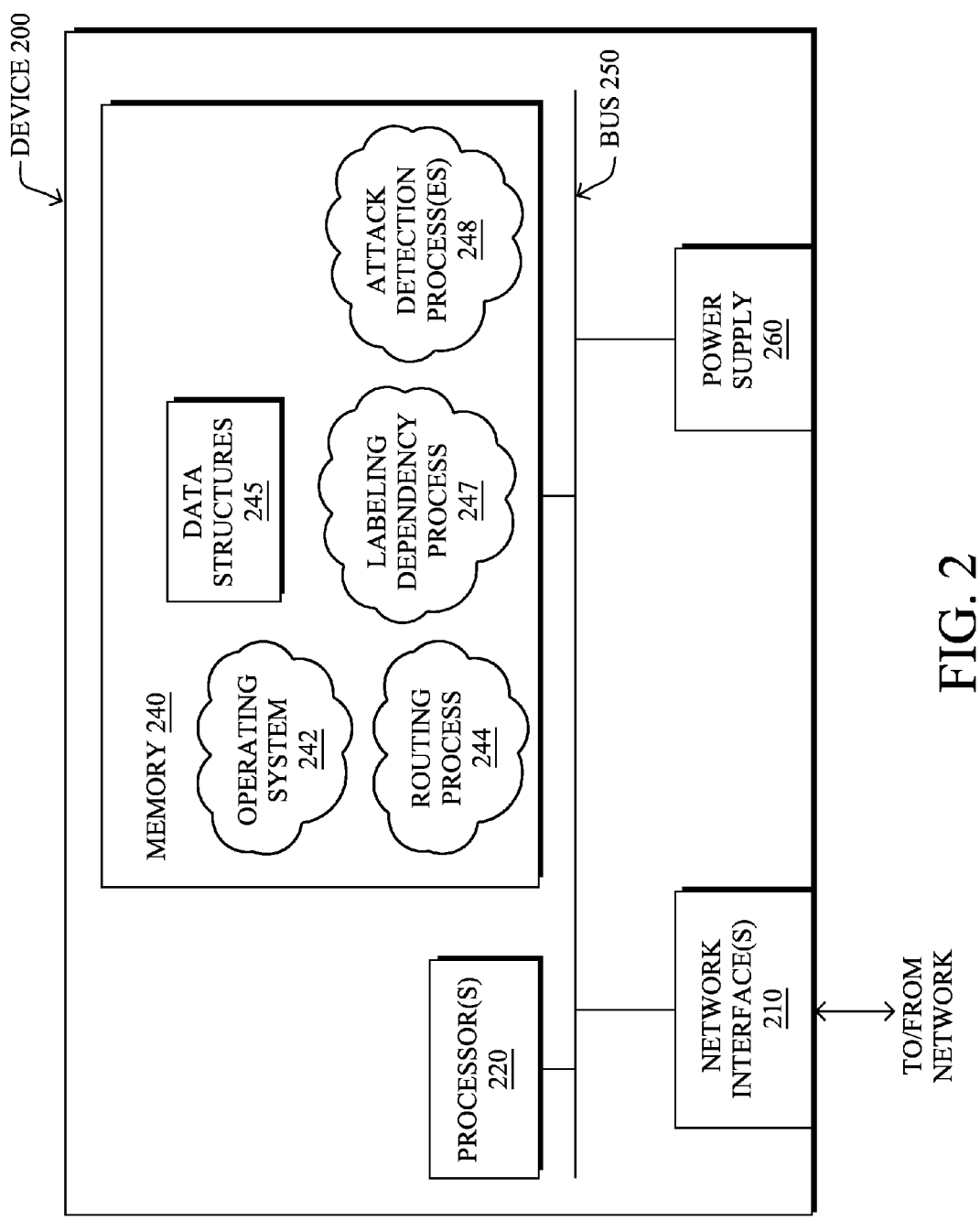
FIG. 2 illustrates an example network device/node.

FIG. 2 is a schematic block diagram of an example node/device 200 that may be used with one or more embodiments described herein, e.g., as any of the devices shown in FIG. 1 (e.g., a server/controller 102, a node/device 104, etc.). The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a label dependency process 247, and/or one or more attack detection process(es) 248 (e.g., device 200 may execute zero, one, or more attack detection processes), as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process(es) 248 includes computer executable instructions executed by the processor 220 to perform various functions, such as attack detection and reporting. In various embodiments attack detection process 248 may use machine learning to detect an attack. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, any of attack detection processes 248 may be an attack detection classifier that classifies network traffic or conditions into either an "attack" category or a "normal operation" category, based on learned behavior of the network. Further categories that represent specific types of attacks may also be used (e.g., a "UDP flooding attack" label, etc.). Said differently, attack detection process 248 may be configured to assign one of a set of output labels (e.g., "normal," "attack," etc.) to an input set of network observations or metrics. In various cases, an applied label may also have an associated probability determined by the learning machine (e.g., a confidence score associated with an applied label, etc.).

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection processes 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by attack detection processes 248 to detect previously unseen forms of attacks.

In further embodiments, attack detection processes 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Label dependency process 247, as described in greater detail below, includes computer executable instructions executed by the processor 220 to perform functions regarding the relationship between the output labels of attack detection processes 248. For example, and as discussed in greater detail below, one of attack detection processes 248 may label data regarding the network as either "normal" or "attack," while another one of processes 248 may label the same data as either "normal," a "DoS flooding attack," or "subtle attack." In such a case, label dependency process 247 may be configured to arbitrate between the two different detectors, so that a finalized label may be applied that that takes into account the outputs of both attack detectors.

Figure 3A:
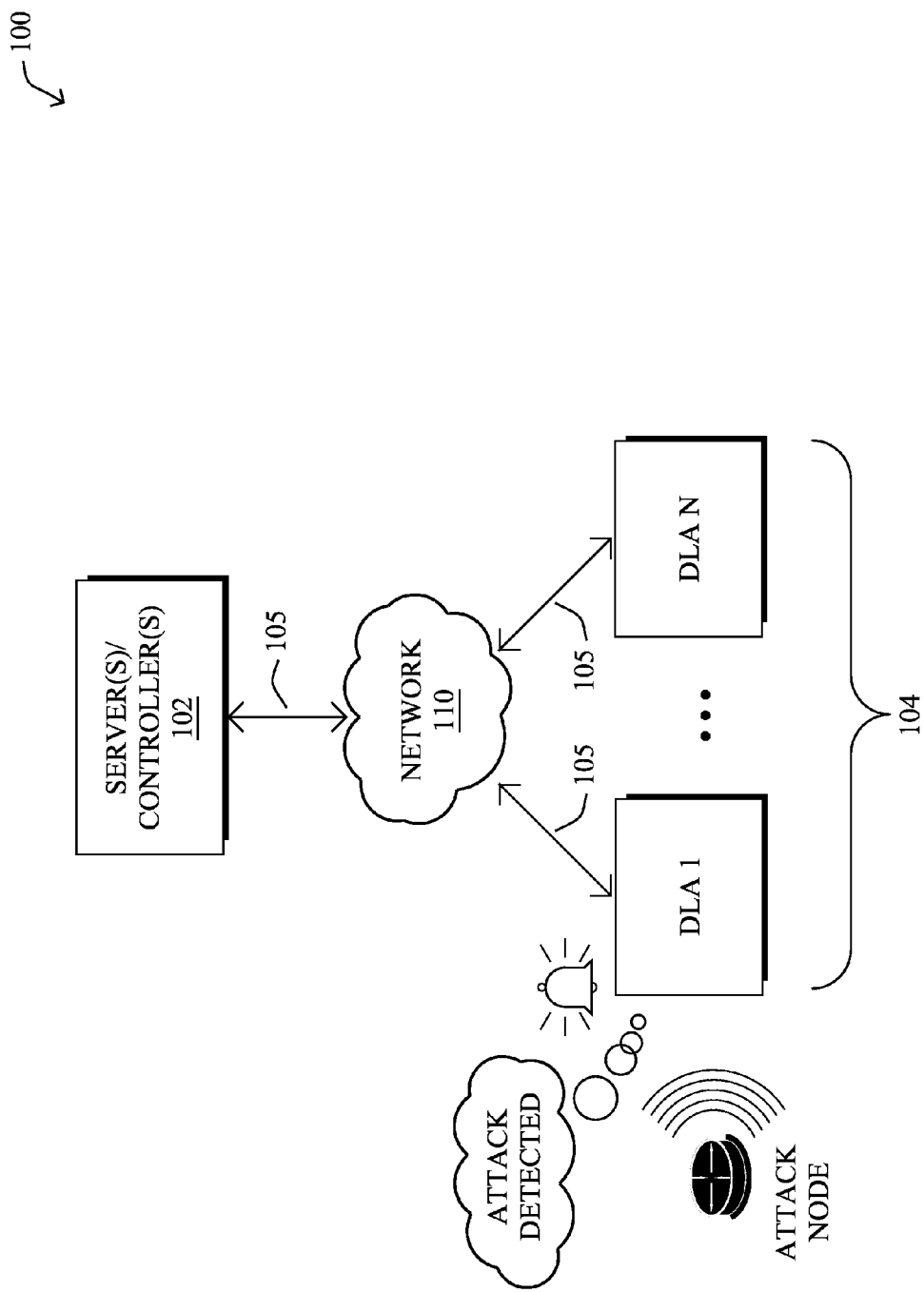
FIGS. 3A-3B illustrate an example of a network attack being detected.
Figure 3B:
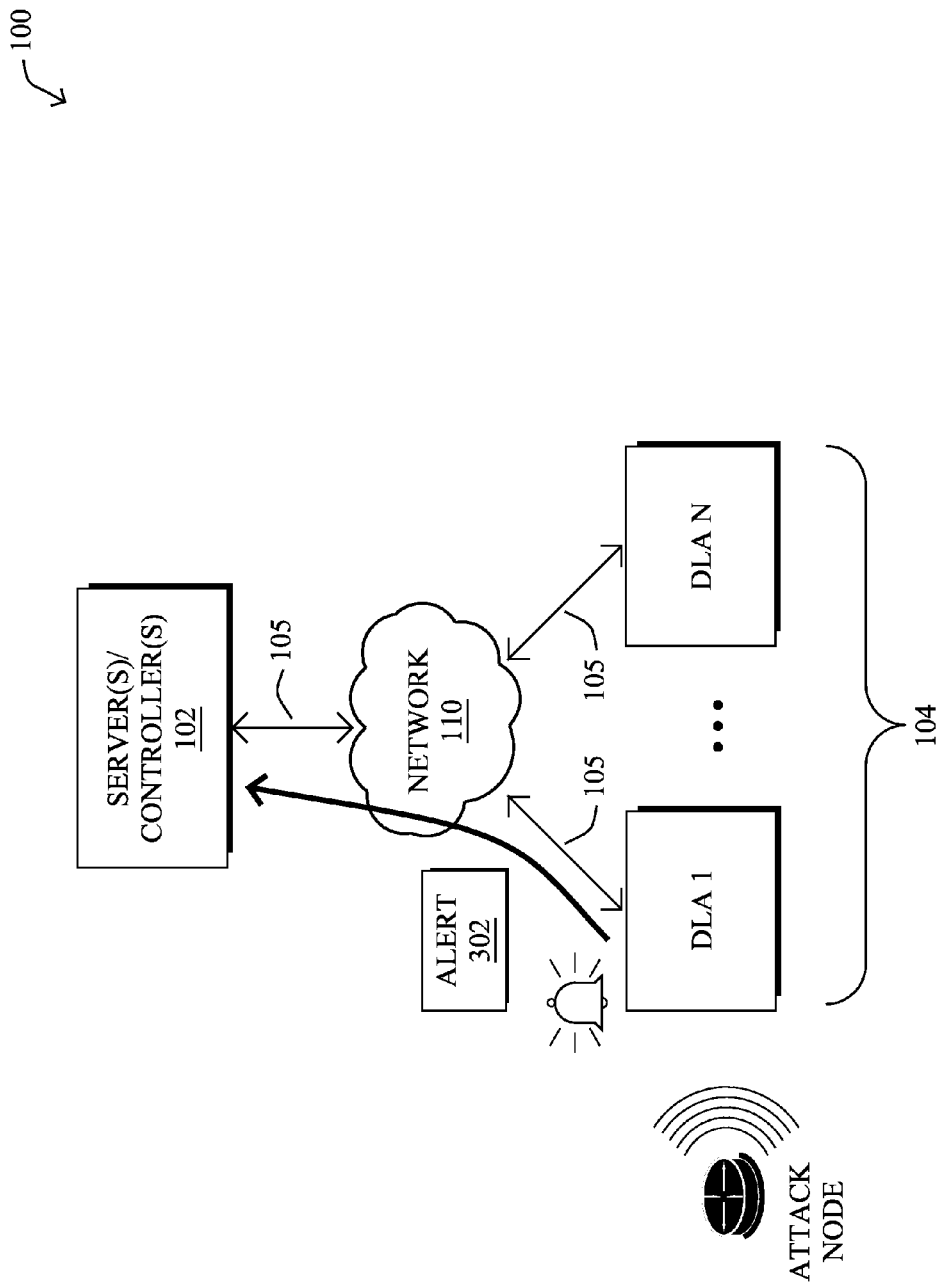

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248) as a DLA (e.g., DLA1 shown). DLA1 may observe traffic behavior and apply a label (e.g., a classification) to the observed traffic behavior. For example, DLA1 may determine that a sharp increase in request traffic is indicative of an attack (e.g., the observed behavior may be labeled as an attack by the device's machine learning process). In such a case, as shown in FIG. 3B, DLA1 may initiate countermeasures, such as sending an alert 302 to one of the servers/controller 102 (e.g., to alert a network administrator), etc.

As noted above, machine learning-based classifiers may be used to provide a distributed and adaptive attack detection framework within a network. However, a tradeoff may exist when designing such a classifier. In particular, designing an attack detection classifier that has a high recall (e.g., sensitivity) may also lead to a higher number of false positives. Further, when different classifiers are executed in parallel, this may increase their collective sensitivity, thereby increasing the risk of misclassification. Thus, different attack detection classifiers having different performances (e.g., recall, precision, false positives, etc.) and potentially different sets of output labels may be deployed throughout a network.

Network Attack Detection Using Combined Probabilities

The techniques herein provide a mechanism for describing, installing, and exploiting the dependencies between overlapping classes (e.g., labels) used by different attack detection classifiers, allowing for a more robust classification. The different classifiers may be distributed across different network devices or co-located on the same device, in various implementations. In one aspect, the relationships between different sets of classes/labels may be described by way of a "tree of label dependencies." In another aspect, the different classifiers and a description of their label dependencies may be deployed to one or more network devices. In a further aspect, the label dependencies may be used to control how the results of the different classifiers are combined, either locally or in a distributed manner. In yet another aspect, the deployment of the classifiers and their label dependencies may be tuned, to satisfy one or more performance metrics.

Specifically, according to one or more embodiments of the disclosure as described in detail below, a device in a network receives a set of output label dependencies for a set of attack detectors. The device identifies applied labels that were applied by the attack detectors to input data regarding a network, the applied labels being associated with probabilities. The device determines a combined probability for two or more of the applied labels based on the output label dependencies and the probabilities associated with the two or more labels. The device selects one of the applied labels as a finalized label for the input data based on the probabilities associated with the applied labels and on the combined probability for the two or more labels.

Illustratively, the techniques described herein may be performed by hardware, software, and/or firmware, such as in accordance with the processes 244 and 247-248, which may include computer executable instructions executed by the processor 220 (or independent processor of interfaces 210) to perform functions relating to the techniques described herein.

Operationally, the following notation is used herein to describe certain aspects:

DLA(i): Distributed Learning Agent "i". A Distributed Learning Agent can be any element of the network with computational capabilities, such as a router, a switch, a Network Controller, etc. (e.g., any of nodes/devices 104).

C(i,j): classifier "j" installed in DLA(i). In various cases, a given node/device may have one or more installed attack detection classifiers. For example, DLA1 may have 1-j number of different classifiers installed.

L(i,j): set of labels provided by classifier C(i,j). For instance, L(i,j)={"Normal", "UDP Flooding Attack", "TCP SYN Flooding Attack"}.

Lij,k: the label "k" in the set of labels L(i,j). For instance, if L(i,j)={"Normal", "UDP Flooding Attack", "TCP SYN Flooding Attack" }, Lij,2 is "UDP Flooding Attack".

Figure 4A:
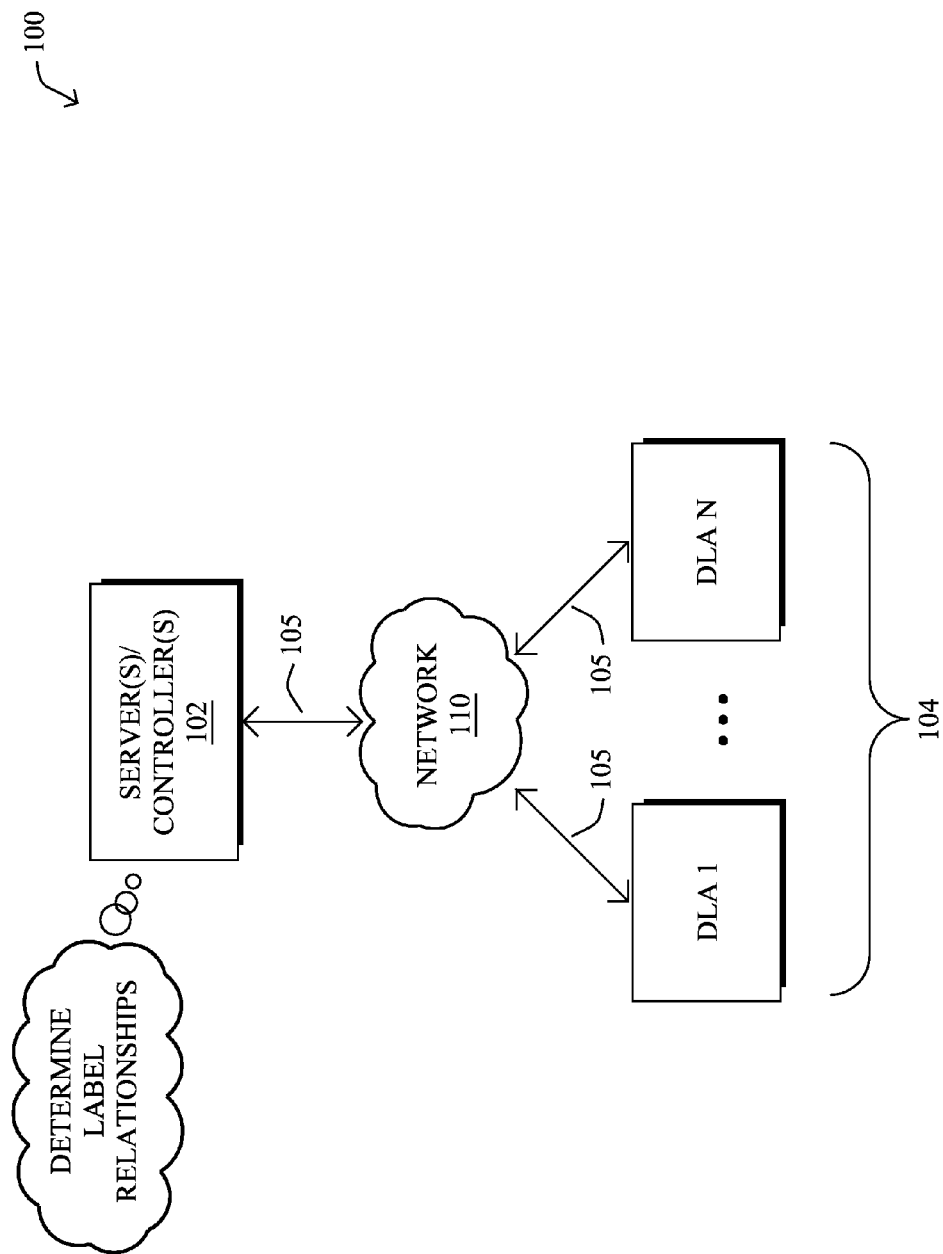
FIGS. 4A-4B illustrate an example of label dependencies being distributed to network attack detectors.
Figure 4B:
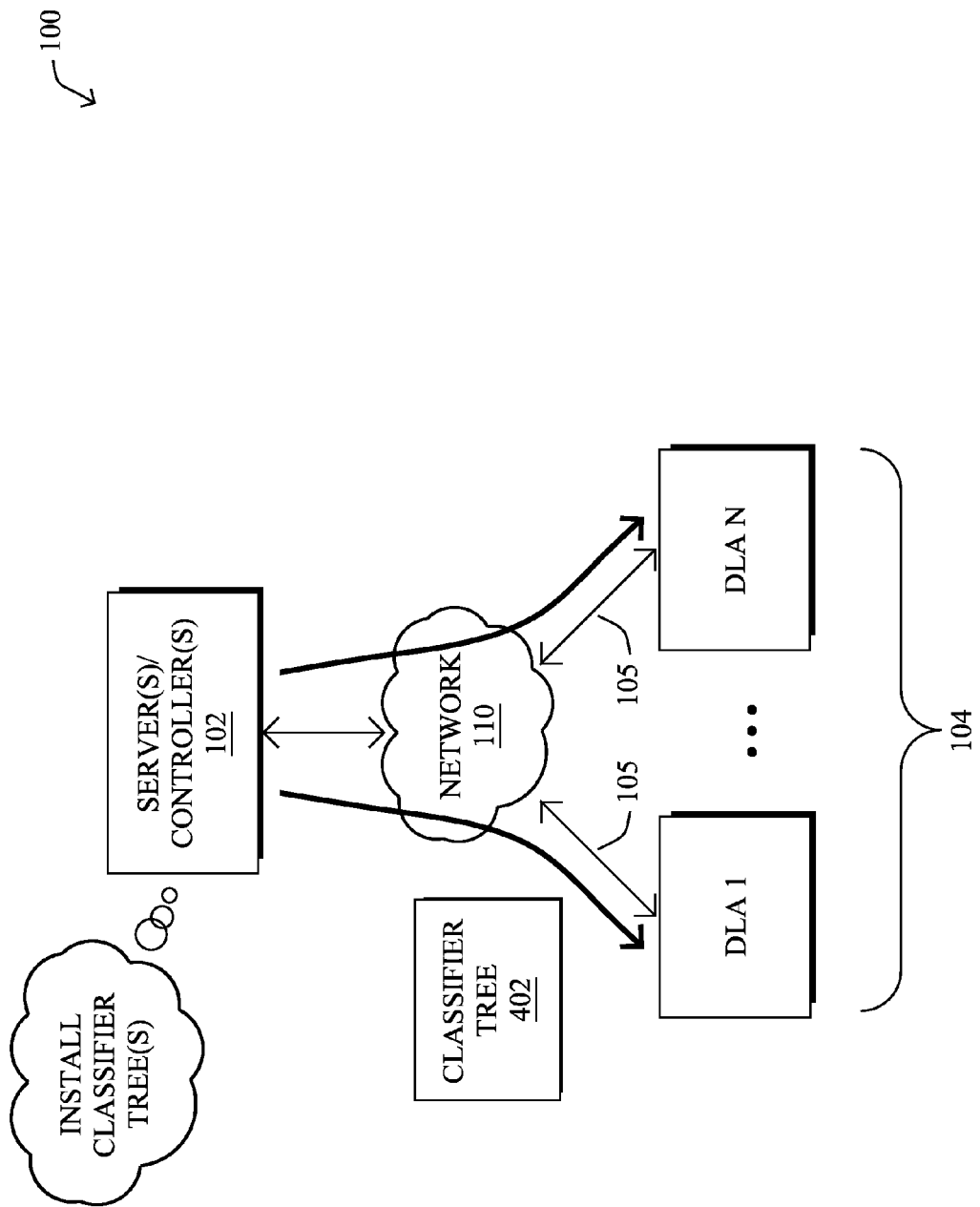

In some embodiments, a mechanism is introduced herein that describes the relationship between different sets of labels used by different classifiers. For example, as shown in FIGS. 4A-4B, one of servers/controllers 102 (e.g., an NMS, network controller, etc.) may act as a centralized learning agent that determines the label relationships between the labels used by the classifiers hosted by DLA1-DLAN. Any of DLA1-DLAN may alternatively act as the centralized learning agent, in further embodiments. As shown in FIG. 4B, the label dependencies may then be installed to any of the DLAs.

Figure 5:
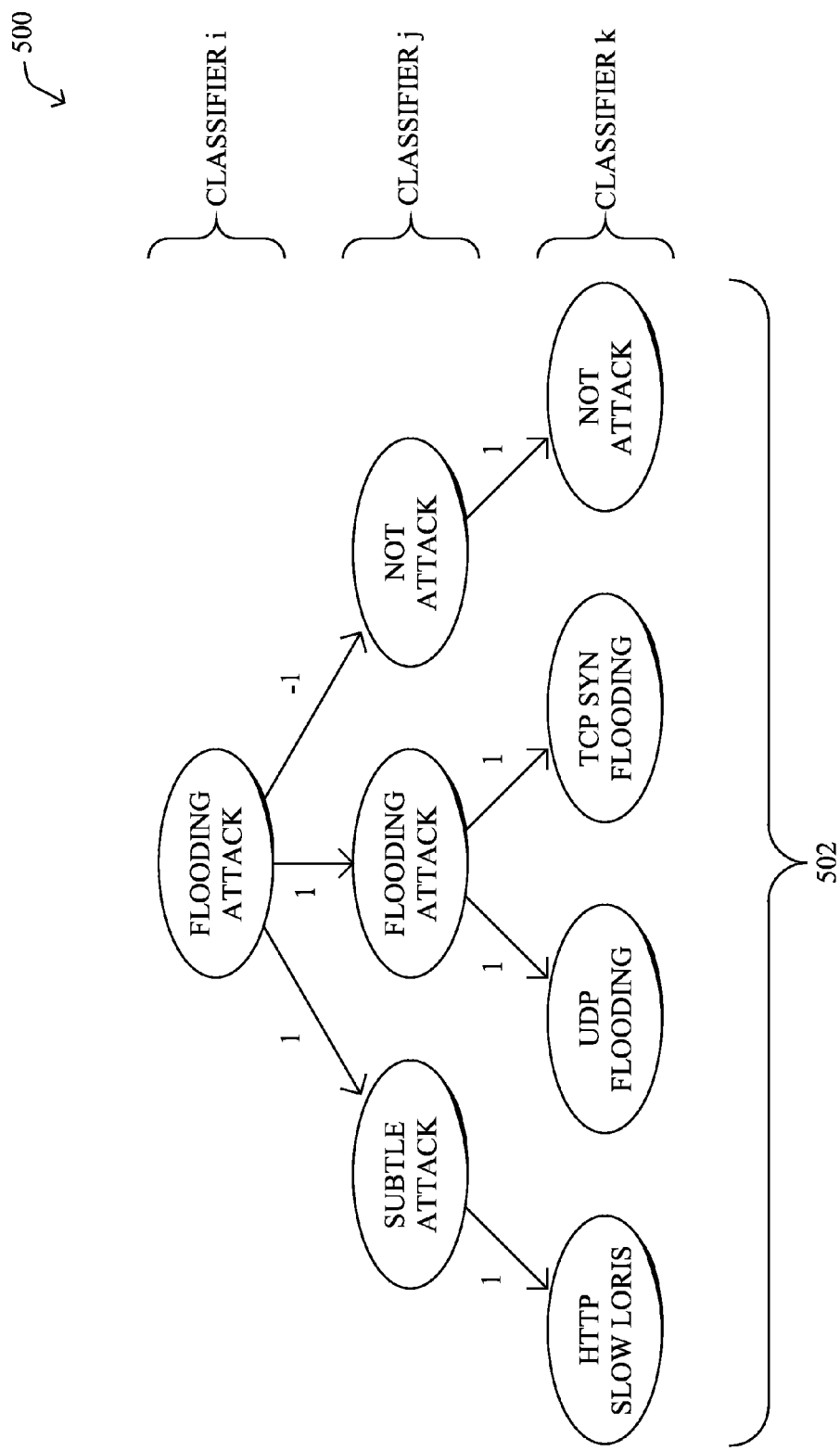
FIG. 5 illustrates an example of a set of label dependencies for different attack detectors.

In one embodiment, label dependencies may be represented by the learning agents as a directed acyclic weighted graph where nodes are labels, links denote dependency and the weights, whose accepted values are 1 and −1, denote direct relationship (1) or inverse relationship (−1). For example, as shown in FIG. 5, an example label dependency tree 500 is shown, in one embodiment. As shown, each of classifiers i-k may assign different labels to a set of input features (e.g., network observations or metrics computed from the observations). Associated with each label may also be a probability calculated by the respective classifiers. For example, classifier j may assign a probability (e.g., confidence score, etc.) to a particular label. Such a score may be based, for example, on how well the input features match the features associated with the corresponding label, etc.

Direct or inverse dependencies between labels in tree 500 may define a hierarchy between the classifiers, thereby allowing the results of the classifiers to be assessed both individually and in combination. For example, as shown, the "Attack" label from classifier i is directly linked to the "Flooding Attack" label of classifier j which is, in turn, directly linked to the "UDP Flooding" label of classifier k. In such a case, the probability of the "UDP Flooding" label may be computed as the combined probability of each of these labels independently, e.g., as p("Attack" U "Flooding Attack" U "UDP Flooding"). Inverse relationships between tree 500 may also be used to determine a combined label probability. For example, the "Not Attack" label of classifier j is inversely related to the "Attack" label of classifier i. In such a case, the combined probability for "Not Attack" across classifiers i and j may be computed as p(not("Attack") U "Not Attack"), where p(not("Attack"))=1−p("Attack"). In some cases, tree 500 may be generated manually via a user interface device operated by a user. In other cases, tree 500 may be generated automatically by label dependency process 247 (e.g., by matching label descriptions or other information associated with the labels). Notably, any number of label dependency trees may be generated.

Once a set of label dependencies has been determined, the centralized learning agent may distribute the classifiers and their corresponding sets of label dependencies among a set of DLAs. For example, as shown in FIG. 4B, a server/controller 102 may distribute a classifier tree 402 (e.g., a set of link dependencies) to one or more of network nodes/devices 104. In some cases, the centralized learning agent may also distribute the associated classifiers to the one or more DLAs either prior to, during, or after the link dependencies are sent.

In one embodiment, the centralized learning agent may send a custom classifiers_tree message as an IPv4 or IPv6 unicast or multicast message. The message may include, for example, any or all of the following type-length-values (TLVs):

{C(i,j1), C(i,j2), . . . , C(i,jN)}: the set of descriptions of classifiers to be deployed on each DLA. The description of a classifier depends on the type of classifier. For instance, for an Artificial Neural Network (ANN), this description may include at least the number and type of input neurons, the number and type of hidden neurons, the number, and type of output neurons and the weights of the links linking the neurons.

{L(i,j1), L(i,j2), . . . , L(i,jN)}: the sets of labels used by {C(i,j1), C(i,j2), . . . , C(i,jN)}.

Probability Reporting Flags: in some cases, one or more of the labels in the set {L(i,j1), L(i,j2), . . . , L(i,jN)} may have an associated probability reporting flag. When the flag is set, probabilities associated with such a label may be reported to the centralized learning agent or to another DLA.

{TLD(i,1), . . . , TLD(i,M)}: the set of Tree Label Dependencies that are to be used by the Distributed Learning Agent "i".

In response to receiving a classifiers_tree message, the DLA installs the indicated classifiers and constructs the trees of label dependencies according to the graph(s) received. In another embodiment, such a message may be sent to a well-known multicast group that includes a plurality of DLAs. In such a case, the receiving DLAs in the multicast group will process the message in a similar manner (e.g., by installing the classifiers and label dependencies).

Figure 6:
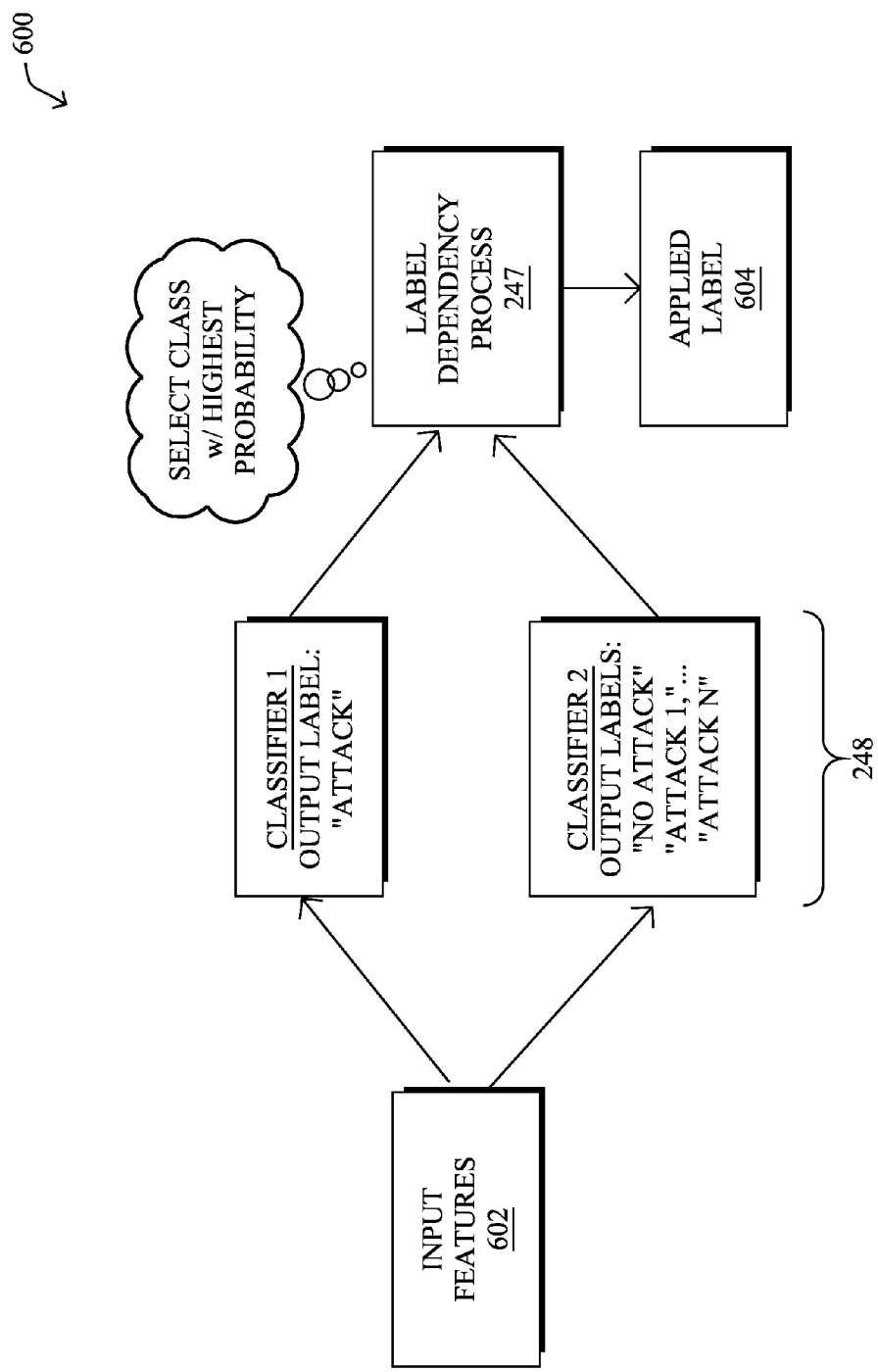
FIG. 6 illustrates an example architecture for attack detection.

Referring now to FIG. 6, an example architecture 600 for attack detection is shown, according to various embodiments. As shown, input features 602 may be evaluated by any number of different classifiers (e.g., attack detection processes 248). In general, input features 602 may include any number of observed network characteristics and/or calculations based on such observations. For example, input features 602 may include data regarding a network link or path (e.g., the amount of delays, jitter, signal strength, packet loss, bandwidth usage, etc.), the operation of a network device (e.g., queuing delays, resource usage, etc.), the network traffic (e.g., the types of traffic, the amount of traffic, etc.), or any other information that may be obtained regarding operation of the network. Similarly, input features 602 may include calculations or statistics regarding any of the observed characteristics (e.g., an average amount of delay, etc.). Any or all such information may be combined from input features 602 into one or more feature vectors that may be used as inputs to the classifiers. For instance, in the context of DoS detection in an edge router, the vector of input features can be a set of features (e.g., computed using NetFlow reports and/or other sources of information) that describe the current traffic in the network. In this case, the different labels of the classifiers will correspond to the different attacks that can be detected, as well as the label "not attack".

Each of attack detection processes 248 may evaluate its input features from input features 602 and apply a label to the features. For example, classifier 1 shown may only make a binary determination as to whether or not its evaluated features indicate an attack. However, classifier 2 may be configured to determine not only that an attack is detected, but that the attack is of a certain type. Associated with each label generated by attack detection processes 248 may be probabilities that represent how well the label "fits" the model of the classifier. For example, the probability may be a measure of how likely the applied label is actually correct. Label dependency process 247 may then apply the label dependencies to evaluate the applied labels and their associated probabilities, to select a finalized applied label 604 (e.g., classification).

In various embodiments, input features 602, attack detection processes 248, and label dependency process 247 may be executed by the same device or may be distributed across different devices. For example, in some cases, one device may execute a first classifier while another device executes a second classifier, the outputs of which are then evaluated by label dependency process 247. In another example, the different classifiers and label dependency process 247 may be co-located on the same device.

In one embodiment, a DLA may evaluate all of the probabilities associated with the applied labels and generate an alarm if, according to a predefined policy, the probability of a particular label satisfies some condition (e.g., exceeds a probability threshold). For example, given the previous example from FIG. 5, one policy may specify that the device is to generate an alarm if the "UDP Flooding" label has the highest probability among the different labels. In this example, the probability of the "UDP Flooding" label is computed as p("Attack" U "Flooding Attack" U "UDP Flooding") and the alarm may be generated if this probability is higher than the probabilities associated with any of the other labels in $\{L(i,j1), \ldots, L(i,jN)\}$ (e.g., "TCP SYN Flooding attack", "DNS Reflection attack", "Not Attack," etc.). Another example of a policy may be to generate an alarm if the probability of any label corresponding to an attack is higher than the probability of the label "Not Attack" during a certain period of time.

In some cases, each DLA may apply their respective labels to the input features and report some or all of the labels and corresponding probabilities to other DLAs or to the centralized learning agent. In this case, a tree of label relationships considering probabilities of labels obtained by different DLAs, may be evaluated. For instance, the probability of "UDP Flooding Attack" can be evaluated in the CLA or in DLAN using the relationship "Attack"-(1) →"Flooding Attack"-(1)→"UDP Flooding", where the probability of "Attack" has been computed by DLA(i), the probability of "Flooding Attack" by DLA(j) and the probability of "UDP Flooding" by DLA(k). In this distributed mode of operation, a mechanism for assuring that all the probabilities are evaluated for the same input features is needed.

Figure 7A:
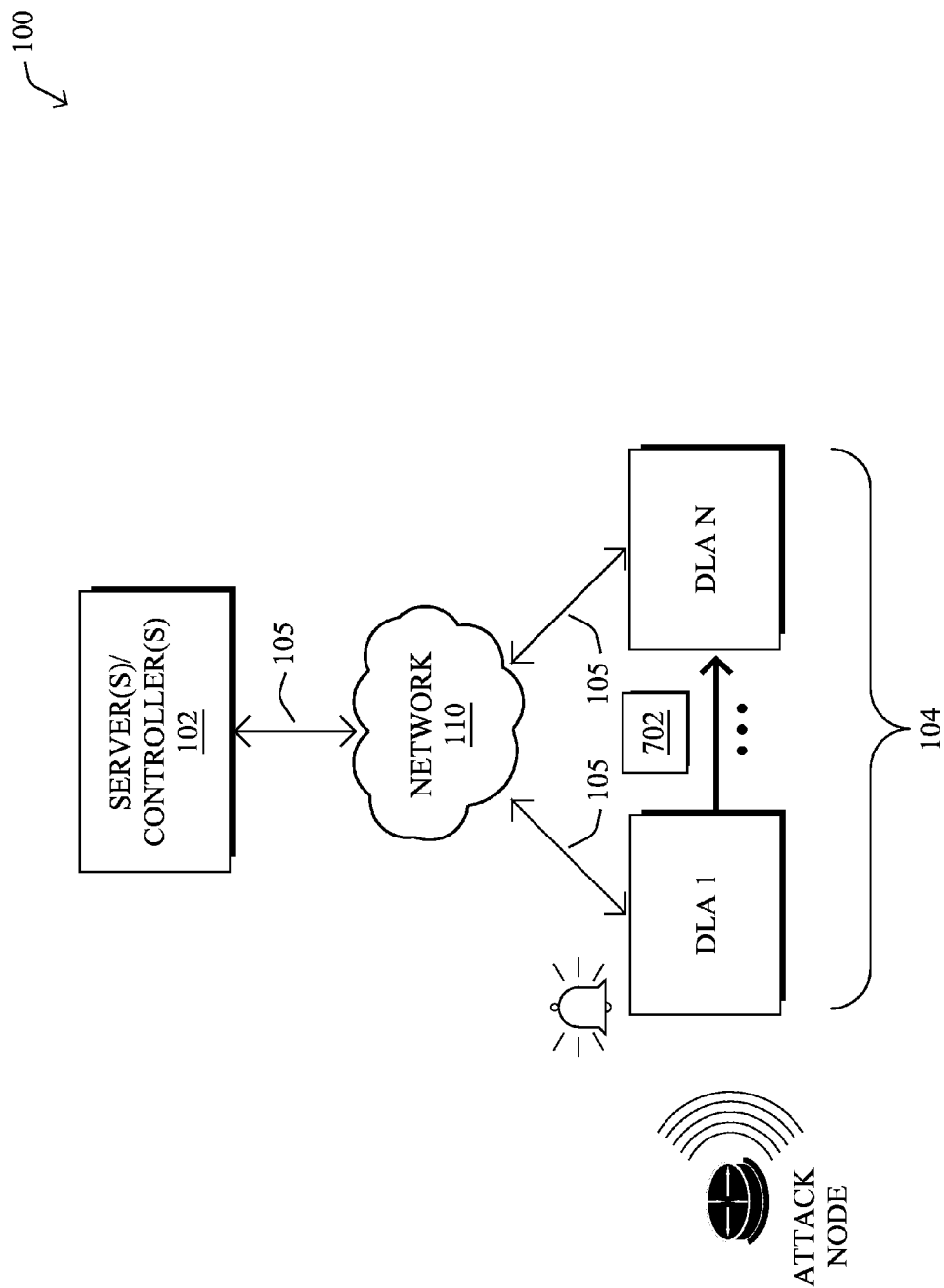
FIGS. 7A-7B illustrate an example of an attack being detected collaboratively by different devices.
Figure 7B:
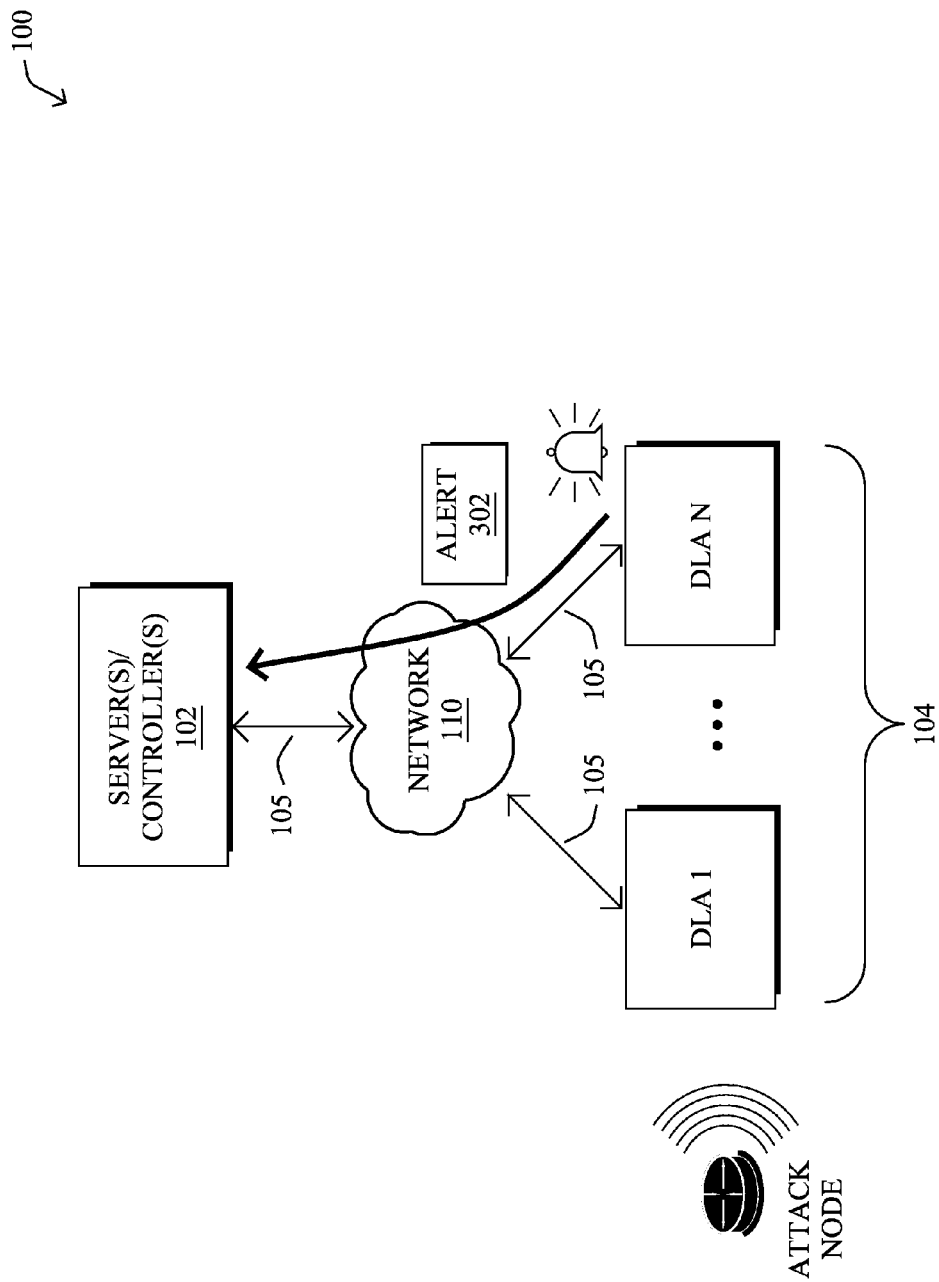

In another embodiment, two or more DLAs can be concatenated for disambiguating borderline detection. In particular, if a DLA computes similar probabilities for two or more attacks, another DLA can be activated which has been specifically trained for disambiguating such attacks. In particular, the output of the second DLA only includes the probabilities of a subset of the possible attacks. For example, as shown in FIG. 7A, DLA1 may send a message 702 to DLAN that indicates that DLA1 computed similar probabilities for two different labels. In response, DLAN may select which among these labels should be applied and may generate an alert 302, as shown in FIG. 7B. An example of such a second DLA may be an ANN which has been trained only on a data set including the attacks to be disambiguated. This approach is, in general, not very scalable since it entails potentially creating a disambiguating DLA for each attack pair. However, based on the training set, it may be possible to foresee which attack subsets are likely to generate close probabilities (the so-called confusion matrix is a well-known tool in ML which can easily show ambiguous attacks).

Figure 8B:
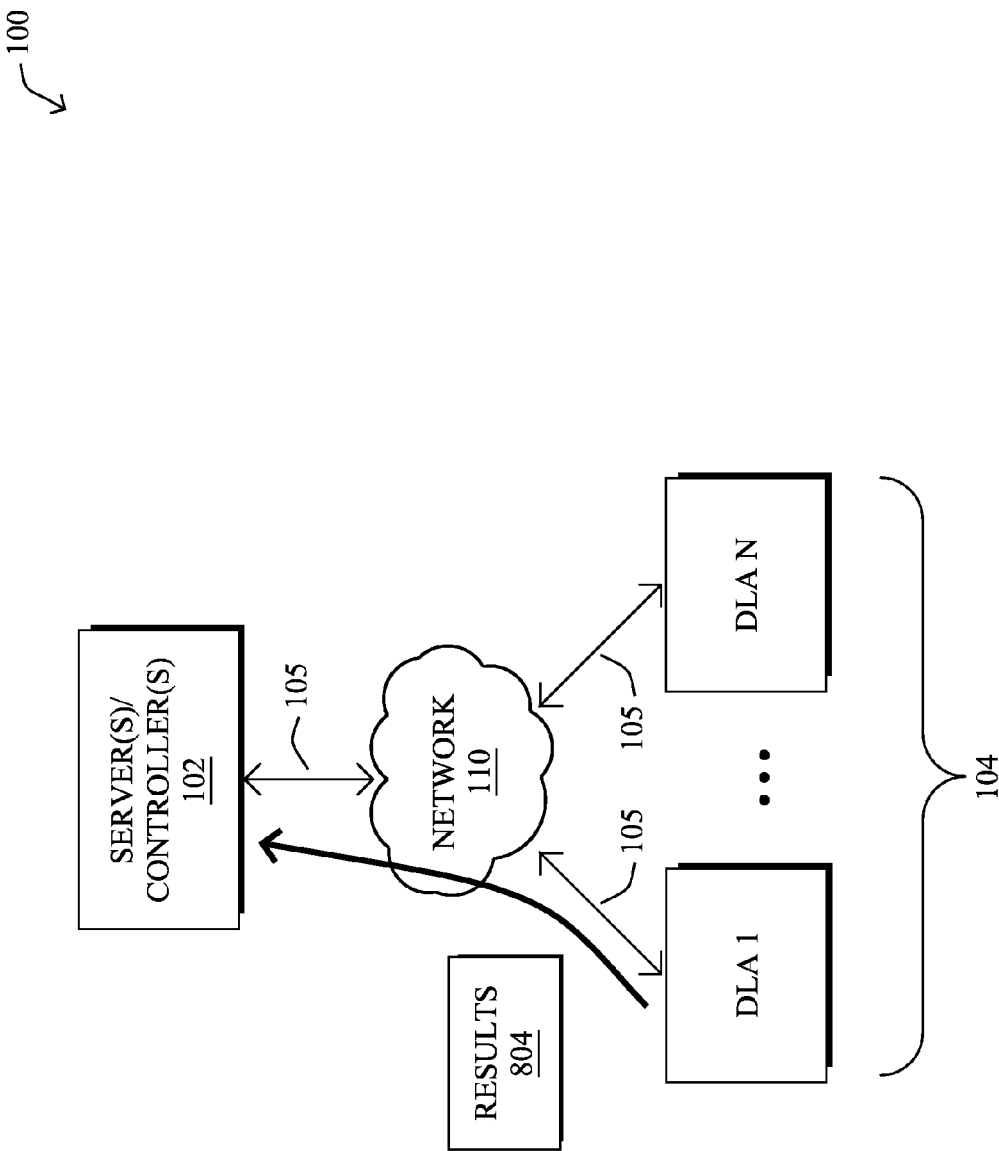

Referring now to FIGS. 8A-8C, an example of an attack detector being validated is shown, according to various embodiments. In some cases, the adaptation of the classifiers and/or label dependencies may be validated and updated any number of times. For example, as shown in FIG. 8A, a centralized learning agent hosted by a server/controller 102 (e.g., an NMS, etc.) may send a validation set 802 to one or more of the DLAs, thereby requesting each DLA to evaluate the samples in the set. In turn, in FIG. 8B, each evaluating DLA may send a results message 804 back to the centralized learning agent that includes its classifier outputs. In general, validation set 802 may have an associated ground truth label (e.g., the input data may be labeled manually by a human expert or automatically by a trusted expert device). Using this information, the centralized learning agent may calculate an optimum tree of label dependencies to minimize or maximize a particular criterion, as shown in FIG. 8C. For instance, one criterion may be to minimize the number of false negatives (e.g., attacks not detected), while another criterion may be to minimize the number of false positives (e.g., false alarms). Once this optimum tree is computed, the classifiers and/or label dependencies in some or all DLAs can be updated using a classifiers_tree message 402.

Figure 9:
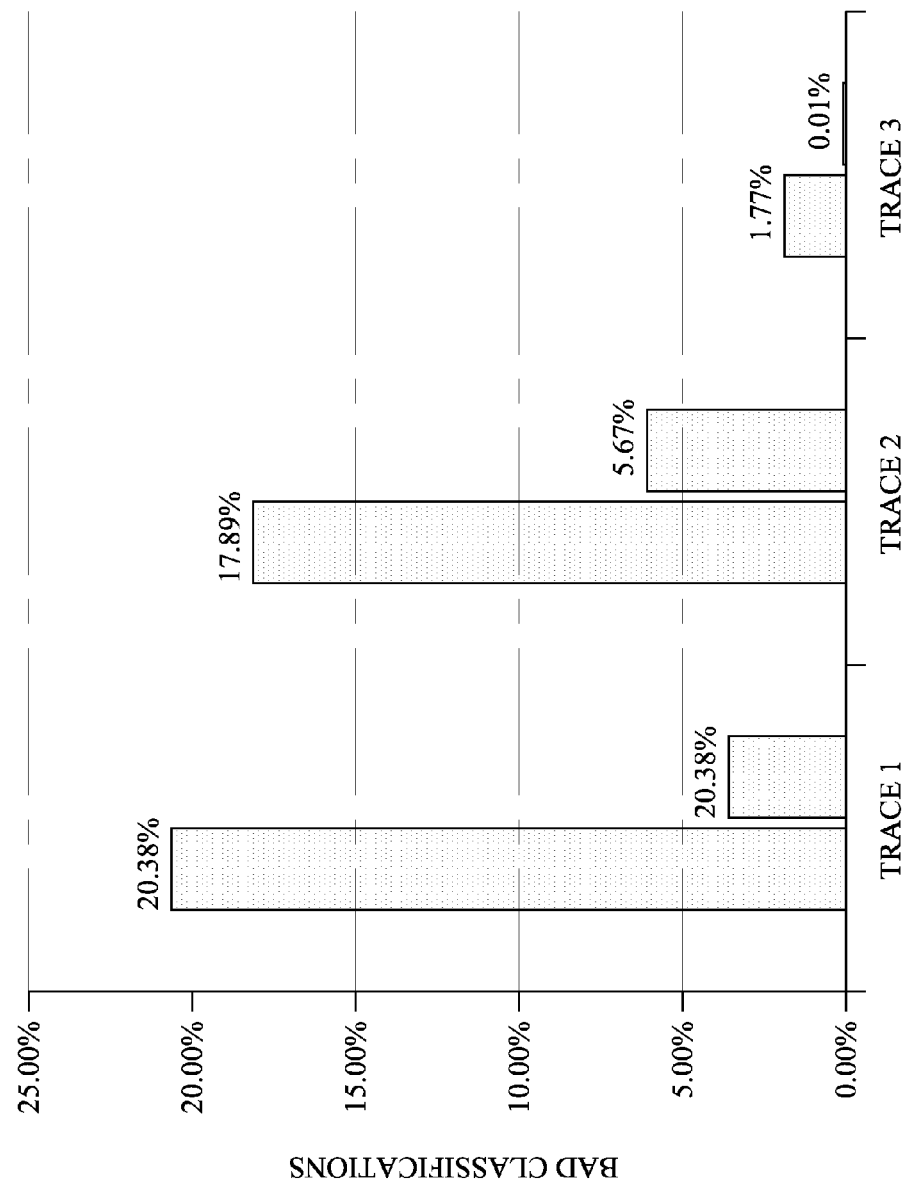
FIG. 9 illustrates an example graph comparing attack detection rates using single and multiple attack detectors.

Referring now to FIG. 9, an example graph comparing attack detection rates using single and multiple attack detectors is shown. A number of preliminary tests were conducted by comparing the percentage of incorrect classifications by a single classifier and by a set of classifiers according to a tree of label dependencies (TLDs). As shown in graph 900, the combined classifier results were shown to significantly improve the overall classification results and may, consequently, reduce the number of false positives.

Figure 10:
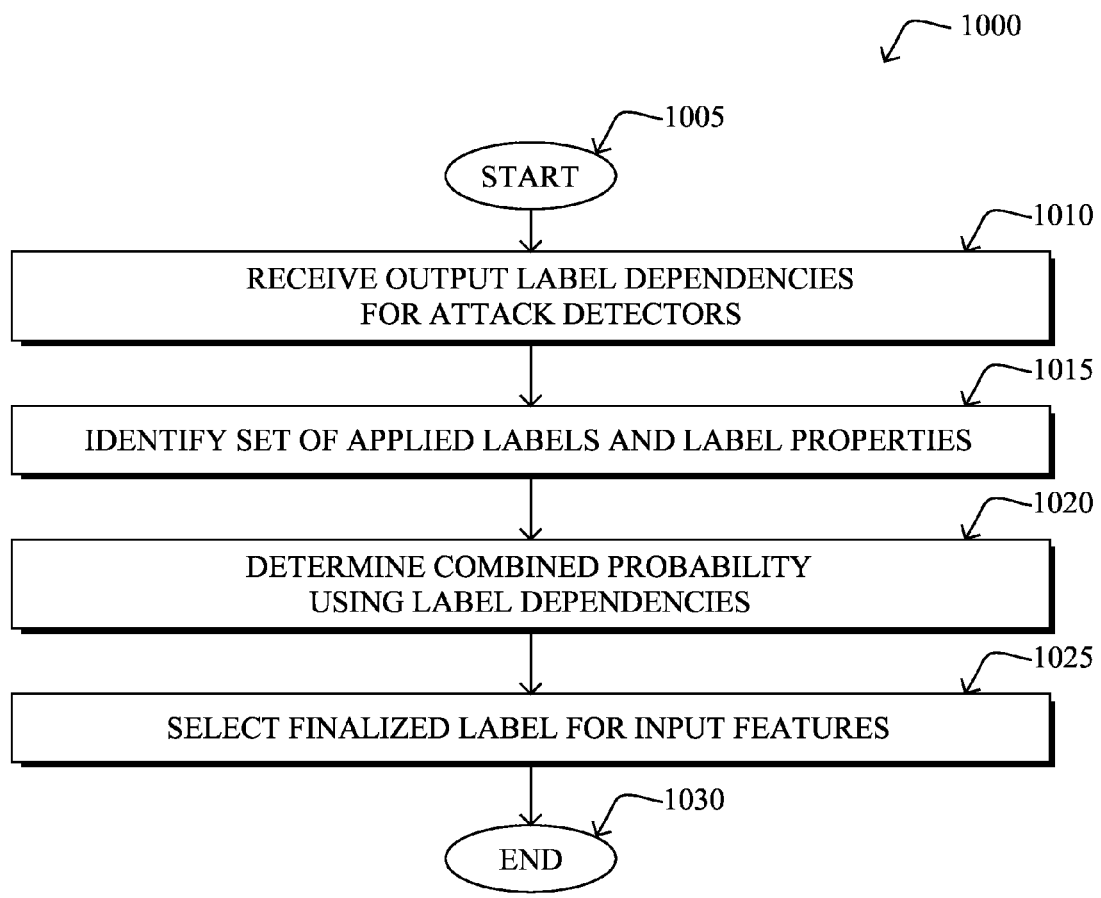
FIG. 10 illustrates an example simplified procedure for detecting a network attack using combined probabilities.

FIG. 10 illustrates an example simplified procedure for detecting a network attack using combined probabilities in accordance with one or more embodiments described herein. The procedure 1000 may start at step 1005, and continues to step 1010, where, as described in greater detail above, a device receives a set of output label dependencies for a plurality of attack detection classifiers. For example, as shown in FIG. 4A, DLA1 (e.g., one of devices 104) may receive a tree of label dependencies from a controller/server 102. In some embodiments, the device itself may execute one or more of the classifiers. In other embodiments, one or more other devices may execute the classifiers and send their corresponding results to the device.

At step 1015, the device receives a set of labels that were applied by the attack detectors to input data regarding the network, as described in greater detail above. In various embodiments, the device may also receive probabilities associated with the applied labels. For example, a first classifier may apply a label A to the input data with a first probability P1 while a second classifier may apply a label B to the input data with a second probability P2.

At step 1020, the device determines a combined probability for two or more of the applied labels based on the output label dependencies and the probabilities associated with the two or more applied labels, as detailed above. For example, as shown in FIG. 5, assume that classifiers i-k applied the labels "Attack," "Flooding Attack," and "TCP SYN Attack," with associated probabilities P1-P3, respectively. In such a case, the device may determine the combined probability as P(P1 U P2 U P3). Notably, a label dependency may also indicate an inverse relationship between labels. For example, "Not Attack" and "Attack" may be inversely related. In such a case, the probability that one of the labels is not true may be used to compute the combined probability.

At step 1025, the device selects the finalized label for the input features from among the individual and combined probabilities, as described in greater detail above. For example, even if classifier k in FIG. 5 label an attack as a "TCP SYN Attack," a different label may be applied to the input data, if the combined probability of the applied labels across classifiers i-k for this label indicates that the label is unlikely (e.g., a "No Attack" label was applied by classifier j with a high probability and the "Attack" label was applied by classifier I with a very low probability). In some embodiments, the probability associated with the finalized label may be compared to a threshold value, to determine whether an alert should be generated and/or corrective measures should be taken (e.g., blocking certain traffic, etc.). Procedure 1000 then ends at step 1030.

Figure 11:
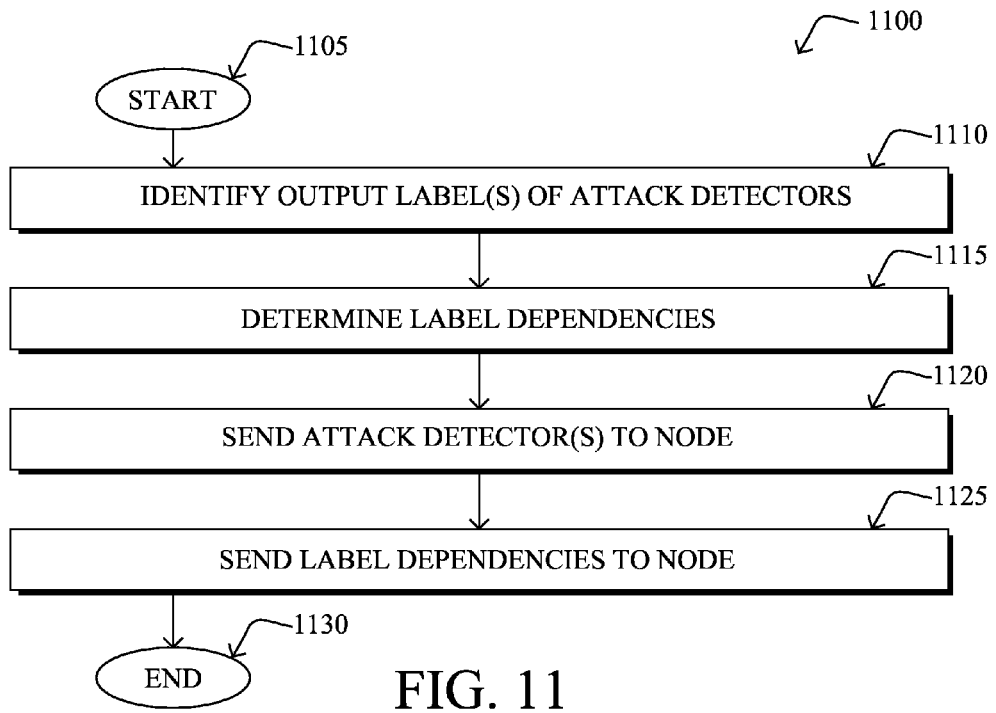
FIG. 11 illustrates an example simplified procedure for distributing attack detectors and label dependencies.

FIG. 11 illustrates an example simplified procedure for distributing attack detectors and label dependencies in accordance with one or more embodiments described herein. Procedure 1100 may be implemented by any device in a network that acts as a centralized learning agent such as, for example, any of the controllers/servers 102 (e.g., an NMS, network controller, etc.) or even a deployed node/device 104. The procedure 1100 may start at step 1105, and continues to step 1110, where, as described in greater detail above, the device identifies the output label(s) used by a set of attack detectors (e.g., machine learning classifiers configured to detect network attacks). As noted previously, different attack detection classifiers may use different sets of output labels to classify data regarding the network.

At step 1115, the device determines label dependencies, as described in greater detail above. For example, a label that simply indicates whether or not an attack is present may be related to another label that classifies an input data set as indicative of a particular type of attack. Accordingly, the label for the particular type of attack may be directly dependent on the more general attack label. In some cases, an inverse relationship may also be determined between labels. The label dependencies may be determined, for example, based on a match between the labels' descriptions, based on input from a user interface device (e.g., as specified by a user), etc.

At step 1120, the device sends the attack detectors to one or more nodes in the network, as described in greater detail above. For example, as discussed above, a server/controller 102 may provide a node/device 104 with one or more attack detectors. In various embodiments, the attack detectors are attack detection processes (e.g., processes 248) that use machine learning-based classification to classify/label a set of input features. In various implementations, a particular node may host one or more attack detection classifiers.

At step 1125, the device also sends the label dependencies determined in step 1115 to the node(s), as described in greater detail above. In various embodiments, the node(s) may use the output label dependencies to select a finalized label from among the output labels applied by the attack detectors. Procedure 1100 then ends at step 1130.

Figure 12:
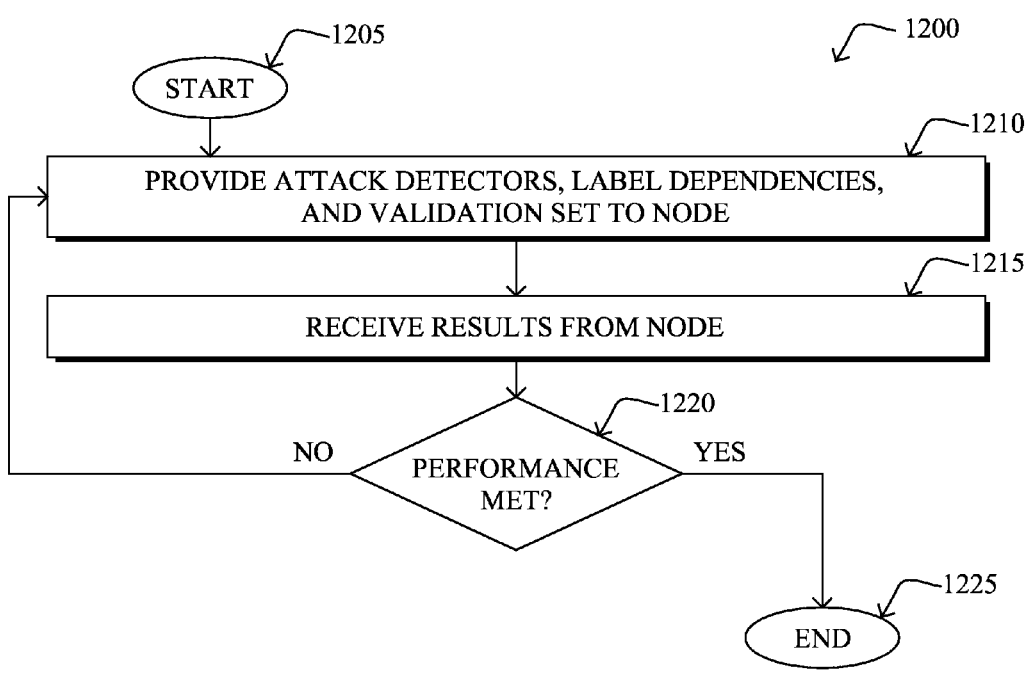
FIG. 12 illustrates an example simplified procedure for dynamically evaluating deployed attack detectors in a network.

FIG. 12 illustrates an example simplified procedure for dynamically evaluating deployed attack detectors in accordance with one or more embodiments described herein. Procedure 1200 may be implemented by any device in a network that acts as a centralized learning agent such as, for example, any of the controllers/servers 102 (e.g., an NMS, network controller, etc.) or even a deployed node/device 104. The procedure 1200 may start at step 1205, and continues to step 1210 where, as detailed above, the device sends attack classifiers, label dependencies, and a validation set of data to one or more nodes in the network. Notably, such information may be sent at the same time (e.g., to validate the classifiers prior to initialization) or at different times (e.g., to validate an already deployed attack detection mechanism). For example, the validation data set may be a set of input data regarding the network that is associated with a ground truth (e.g., an objectively known label).

At step 1215, the device receives classification results from a node, as detailed above. In particular, the node may execute its deployed attack detectors to classify the validation data set and use its deployed label dependencies to determine a finalized label for the validation data set. Once a final label has been determined, the node may return the results (e.g., the finalized label, any labels applied by the individual classifier, and/or their associated probabilities), back to the centralized learning agent.

At step 1220, the device decides whether the classification results satisfy one or more performance metrics, as detailed above. Notably, since the correct label(s) for the validation set is known, the device may compare the received results to this ground truth, to assess the performance of the deployed attack detectors and/or label dependencies. For example, the device may determine a percentage of times the node was able to correctly label data in the validation data set. If such a percentage is below a threshold amount, the device may repeat steps 1210-1220 any number of times (e.g., as part of a control loop), to ensure that the attack detection mechanism deployed to the network satisfies the desired performance. Procedure 1200 then ends at step 1225.

It should be noted that while certain steps within procedures 1000-1200 may be optional as described above, the steps shown in FIGS. 10-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The techniques described herein, therefore, provide for mechanisms that may improve the classification performance of individual classifiers by exploiting the relationships between the output labels used by the classifiers. In the context of detecting DoS attack, the techniques may considerably reduce the number of false positives, while still improving the classification accuracy (e.g., reducing the amount of confusion between the machine learning processes). On one hand, reducing the number of false positives also reduces the number of corrective measures that may be taken (e.g., generating unnecessary alerts, dropping traffic, etc.). On the other hand, reducing confusion between classifiers also helps the attack detection mechanism to better classify attacks and therefore perform more specific and effective mitigation actions.

While there have been shown and described illustrative embodiments that provide for detecting an attack in a network, it is to be understood that various other adaptations and modifications may be made within the spirit and scope of the embodiments herein. For example, the embodiments have been shown and described herein with relation to certain types of network and using certain protocols. In addition, while certain machine learning techniques are described herein, other techniques may also be used to label input data regarding the network as part of an attack detection mechanism.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a network, a set of output label dependencies for a set of attack detectors that exploit dependencies between overlapping labels used by different attack detection classifiers;
identifying, by the device, applied labels that were applied by the attack detectors to input data regarding the network, wherein probabilities are associated with the applied labels;
determining, by the device, a combined probability for two or more of the applied labels based on the output label dependencies and the probabilities associated with the two or more labels; and
selecting, by the device, one of the applied labels as a finalized label for the input data based on the probabilities associated with the applied labels and on the combined probability for the two or more labels.

2. The method as in claim 1, further comprising:
determining, by the device, that a probability associated with the finalized label for the input data is greater than a threshold value; and
generating, by the device, an attack detection alert using the finalized label, in response to determining that a probability associated with the finalized label for the input data is greater than a threshold value.

3. The method as in claim 1, further comprising:
generating, by the device, at least one of the applied labels by executing one or more of the attack detectors to label the input data regarding the network.

4. The method as in claim 3, further comprising:
generating, by the device, all of the applied labels by executing each of the attack detectors to label the input data regarding the network.

5. The method as in claim 1, wherein a particular label dependency in the set of output label dependencies corresponds to an inverse relationship between labels.

6. The method as in claim 1, further comprising:
receiving, at the device, at least one of the applied labels from another device in the network that hosts at least one of the attack detectors.

7. The method as in claim 1, wherein the attack detectors use differing sets of output labels.

8. The method as in claim 1, wherein the input data regarding the network is a validation data set that has an associated ground truth label.

9. A method, comprising:
identifying, by a device in a network and for each of a plurality of attack detectors, a set of output labels used by the attack detector, wherein the attack detector is configured to apply one of the set of output labels to an input data set regarding the network;
determining, by the device, a set of output label dependencies between the sets of output labels for the attack detectors that exploit dependencies between overlapping labels used by different attack detection classifiers;
providing, by the device, the attack detectors to one or more nodes in the network; and
providing, by the device, the set of output label dependencies to the one or more nodes in the network, wherein the one or more nodes use the set of output label dependencies to select a finalized label from among output labels applied by the attack detectors.

10. The method as in claim 9, wherein a particular label dependency in the set of output label dependencies corresponds to an inverse relationship between labels.

11. The method as in claim 9, wherein the attack detectors use differing sets of output labels.

12. The method as in claim 9, further comprising:
providing, by the device, a validation data set to the one or more nodes, wherein the one or more nodes use the attack detectors and the set of output label dependencies to label the validation data set;
receiving, at the device, an indication of the labeled validation set; and
providing a different set of attack detectors and output label dependencies to the one or more nodes based on a determination that the labeled validation set does not satisfy a performance metric.

13. An apparatus, comprising:
one or more network interfaces to communicate with a network;
a processor coupled to the network interfaces and configured to execute one or more processes; and
a memory configured to store a process executable by the processor, the process when executed operable to:
receive a set of output label dependencies for a set of attack detectors that exploit dependencies between overlapping labels used by different attack detection classifiers;
identify applied labels that were applied by the attack detectors to input data regarding the network, wherein probabilities are associated with the applied labels;
determine a combined probability for two or more of the applied labels based on the output label dependencies and the probabilities associated with the two or more labels; and
select one of the applied labels as a finalized label for the input data based on the probabilities associated with the applied labels and on the combined probability for the two or more labels.

14. The apparatus as in claim 13, wherein the process when executed is further operable to:
determine that a probability associated with the finalized label for the input data is greater than a threshold value; and
generate an attack detection alert using the finalized label, in response to determining that a probability associated with the finalized label for the input data is greater than a threshold value.

15. The apparatus as in claim 13, wherein the process when executed is further operable to:
generate at least one of the applied labels by executing one or more of the attack detectors to label the input data regarding the network.

16. The apparatus as in claim 15, wherein the process when executed is further operable to:
generate all of the applied labels by executing each of the attack detectors to label the input data regarding the network.

17. The apparatus as in claim 13, wherein a particular label dependency in the set of output label dependencies corresponds to an inverse relationship between labels.

18. The apparatus as in claim 13, wherein the process when executed is further operable to:

receive at least one of the applied labels from another device in the network that hosts at least one of the attack detectors.

19. The apparatus as in claim 13, wherein the attack detectors use differing sets of output labels.

20. The apparatus as in claim 13, wherein the input data regarding the network is a validation data set that has an associated ground truth label.

21. An apparatus, comprising:
one or more network interfaces to communicate with a network;
a processor coupled to the network interfaces and configured to execute one or more processes; and
a memory configured to store a process executable by the processor, the process when executed operable to:
identify, for each of a plurality of attack detectors, a set of output labels used by the attack detector, wherein the attack detector is configured to apply one of the set of output labels to an input data set regarding the network;
determine a set of output label dependencies between the sets of output labels for the attack detectors that exploit dependencies between overlapping labels used by different attack detection classifiers;
provide the attack detectors to one or more nodes in the network; and
provide the set of output label dependencies to the one or more nodes in the network, wherein the one or more nodes use the set of output label dependencies to select a finalized label from among output labels applied by the attack detectors.

22. The apparatus as in claim 21, wherein a particular label dependency in the set of output label dependencies corresponds to an inverse relationship between labels.

23. The apparatus as in claim 21, wherein the attack detectors use differing sets of output labels.

24. The apparatus as in claim 21, wherein the process when executed is further operable to:
provide a validation data set to the one or more nodes, wherein the one or more nodes use the attack detectors and the set of output label dependencies to label the validation data set;
receive an indication of the labeled validation set; and
provide a different set of attack detectors and output label dependencies to the one or more nodes based on a determination that the labeled validation set does not satisfy a performance metric.

25. A tangible, non-transitory, computer-readable media having software encoded thereon, the software when executed by a processor operable to:
identify, for each of a plurality of attack detectors, a set of output labels used by an attack detector, wherein the attack detector is configured to apply one of the set of output labels to an input data set regarding a network;
determine a set of output label dependencies between the sets of output labels for the attack detectors that exploit dependencies between overlapping labels used by different attack detection classifiers;
provide the attack detectors to one or more nodes in the network; and
provide the set of output label dependencies to the one or more nodes in the network, wherein the one or more nodes use the set of output label dependencies to select a finalized label from among output labels applied by the attack detectors.

26. A tangible, non-transitory, computer-readable media having software encoded thereon, the software when executed by a processor operable to:
receive a set of output label dependencies for a set of attack detectors that exploit dependencies between overlapping labels used by different attack detection classifiers;
identify applied labels that were applied by the attack detectors to input data regarding a network, wherein probabilities are associated with the applied labels;
determine a combined probability for two or more of the applied labels based on the output label dependencies and the probabilities associated with the two or more labels; and
select one of the applied labels as a finalized label for the input data based on the probabilities associated with the applied labels and on the combined probability for the two or more labels.

* * * * *